United States Patent
Kakehi et al.

(10) Patent No.: US 9,821,651 B2
(45) Date of Patent: Nov. 21, 2017

(54) FUEL TANK LID AND FUEL PUMP MODULE HAVING THE SAME

(71) Applicant: DENSO CORPORATION, Kariya, Aichi-pref. (JP)

(72) Inventors: Tatsuya Kakehi, Kariya (JP); Noboru Nagase, Kariya (JP); Kiyoshi Nagata, Kariya (JP); Akihiro Konno, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/125,978

(22) PCT Filed: Mar. 26, 2015

(86) PCT No.: PCT/JP2015/001731
§ 371 (c)(1),
(2) Date: Sep. 14, 2016

(87) PCT Pub. No.: WO2015/151470
PCT Pub. Date: Oct. 8, 2015

(65) Prior Publication Data
US 2017/0080796 A1    Mar. 23, 2017

(30) Foreign Application Priority Data

Apr. 1, 2014  (JP) .................................. 2014-75688

(51) Int. Cl.
*H02G 3/04* (2006.01)
*B60K 15/035* (2006.01)
(Continued)

(52) U.S. Cl.
CPC ............ *B60K 15/035* (2013.01); *B60K 15/05* (2013.01); *F02D 33/003* (2013.01); *F02M 25/08* (2013.01);
(Continued)

(58) Field of Classification Search
CPC .................. B60K 15/035; B60K 15/05; B60K 2015/03236; B60K 2015/0458;
(Continued)

(56) References Cited

U.S. PATENT DOCUMENTS 6,182,693 B1 * 2/2001 Stack ............... B60K 15/03504
123/519
6,332,555 B1 * 12/2001 Stangier ........... B60K 15/03177
220/319

(Continued)

FOREIGN PATENT DOCUMENTS

JP    2003-269276 A    9/2003
JP    2006-329079 A    12/2006

*Primary Examiner* — Angel R Estrada
(74) *Attorney, Agent, or Firm* — Posz Law Group, PLC

(57) ABSTRACT

A fuel tank lid includes a lid part and a terminal. The lid part includes an inserted part inserted into an opening of a fuel tank, and a storage part storing a drive circuit. The terminal has a central portion covered by the inserted part and the storage part, a first end connected to a pump, and a second end connected to the drive circuit. The storage part includes a side wall that has a first opening and a second opening, an upper closure part that closes the first opening, and a lower closure part that closes the second opening. The fuel tank lid further includes a discharge structure positioned vertically lower than the upper closure part and discharging a fuel vapor that has travelled along an interface between the terminal and the lid part and entered a hollow space of the storage part, to an external atmosphere.

14 Claims, 7 Drawing Sheets

(51) Int. Cl.
*F02M 37/10* (2006.01)
*F02D 33/00* (2006.01)
*B60K 15/05* (2006.01)
*F02M 37/00* (2006.01)
*H02K 5/22* (2006.01)
*F02M 25/08* (2006.01)
*F02M 37/08* (2006.01)
*B60K 15/03* (2006.01)
*B60K 15/04* (2006.01)

(52) U.S. Cl.
CPC .... *F02M 37/0076* (2013.01); *F02M 37/0082* (2013.01); *F02M 37/08* (2013.01); *F02M 37/10* (2013.01); *F02M 37/103* (2013.01); *H02K 5/225* (2013.01); *B60K 2015/03236* (2013.01); *B60K 2015/0458* (2013.01); *F02M 2037/082* (2013.01); *F02M 2037/085* (2013.01)

(58) Field of Classification Search
CPC .......... B60K 15/03; B60K 2015/03032; B60K 15/03504; F02D 33/003; F02M 25/08; F02M 37/0076; F02M 37/0082; F02M 37/08; F02M 37/10; F02M 37/103; F02M 2037/082; F02M 2037/085; H02K 5/225
USPC ..... 174/66, 67, 17 CT; 220/241, 242, 366.1, 220/562; 439/535, 536, 550, 544, 939; 123/214, 519

See application file for complete search history.

(56) References Cited

U.S. PATENT DOCUMENTS

| | | | | |
|---|---|---|---|---|
| 6,367,650 | B1* | 4/2002 | Kuehnemund | B60K 15/03 123/514 |
| 6,821,162 | B2* | 11/2004 | Mott | H01R 13/04 439/722 |
| 7,081,012 | B2* | 7/2006 | Gensert | H02G 3/22 174/151 |
| 7,228,847 | B2* | 6/2007 | Burke | B60K 15/03177 123/509 |
| 7,268,301 | B2* | 9/2007 | Hosoya | F02M 37/103 174/135 |
| 7,642,459 | B2* | 1/2010 | Motoda | F02M 37/103 174/17 VA |
| 2006/0081395 | A1 | 4/2006 | Motoda | |

* cited by examiner

FUEL TANK LID AND FUEL PUMP MODULE HAVING THE SAME

CROSS REFERENCE TO RELATED APPLICATIONS

This application is a U.S. national stage of International Application No. PCT/JP2015/001731 filed on Mar. 26, 2015 and is based on based on Japanese Patent Application No. 2014-75688 filed on Apr. 1, 2014, the disclosures of which are incorporated herein by reference.

TECHNICAL FIELD

The present disclosure relates to a fuel tank lid having a lid part and a terminal that is insert-molded in the lid part, and a fuel pump module having the fuel tank lid.

BACKGROUND ART

Patent Literature 1, for example, describes a conventional fuel supply device which includes a fuel tank, a fuel pump unit installed inside the fuel tank, and a controller for the fuel pump unit. The fuel supply device includes a chamber that accommodates the controller, and a lid member that covers the opening of the chamber. The lid member has a higher fuel permeability than the chamber.

In the fuel supply device disclosed in Patent Literature 1, as described above, the lid member has a higher fuel permeability than the chamber. Therefore, when fuel vapor flows into the chamber, the fuel vapor can be discharged to the external atmosphere through the lid member. However, since the fuel vapor is heavier than the air, the fuel vapor accumulates from the bottom of the chamber. Therefore, the fuel vapor contacts the lid part only after the chamber has been filled with the fuel vapor. During this time, the controller stored in the chamber is kept in contact with the fuel vapor, and therefore may be damaged.

PRIOR ART LITERATURES

Patent Literature

Patent Literature 1: JP2003-269276A

SUMMARY OF INVENTION

In view of the problem described above, an object of the present in disclosure is to provide a fuel tank lid that can discharge fuel vapor to an external atmosphere efficiently, and a fuel pump module having the fuel tank lid.

According to an aspect of the present disclosure, the fuel tank lid includes a lid part closing an opening of a fuel tank, and a terminal electrically connecting a pump provided inside the fuel tank with a drive circuit driving the pump. The lid part includes an inserted part inserted into the opening of the fuel tank, and a storage part located outside the fuel tank and storing the drive circuit in a hollow space of the storage part. The terminal has a central portion, a first end, and a second end, the central portion is covered and protected by the inserted part and the storage part that are made of a resin material, the first end is connected to the pump inside the fuel tank, and the second end is connected to the drive circuit inside the hollow space of the storage part. The storage part includes a side wall that is in an annular shape and has two openings that are a first opening and a second opening, an upper closure part that closes the first opening positioned vertically on an upper side of the second opening, of the two openings of the side wall, and a lower closure part that closes the second opening positioned vertically on a lower side of the first opening, of the two openings of the side wall. The fuel tank lid further includes a discharge structure positioned vertically lower than the upper closure part and discharging a fuel vapor that has travelled along an interface between the terminal and the lid part and entered the hollow space of the storage part, to an external atmosphere.

Since the fuel vapor is heavier than the air, the fuel vapor accumulates from the lower closure part of the storage part toward the upper closure part. According to the present disclosure, the discharge structure is positioned vertically lower than the upper closure part. Therefore, the fuel vapor can be discharged to the external atmosphere more efficiently as compared to a configuration where the discharge structure is formed in the upper closure part. Therefore, damage potential of the drive circuit caused by fuel vapor is reduced.

The drive circuit includes a plurality of electronic elements, at least one of which is fixedly attached to the upper closure part so as to avoid from being in contact with the fuel vapor. With this configuration, contact between fuel vapor and electronic elements can be avoided. Thus, deterioration of electronic elements is minimized.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Hereinafter, embodiments of the present disclosure will be described with reference to the drawings.

(First Embodiment)

A fuel tank lid 100 according to the present embodiment will be described with reference to FIG. 1 to FIG. 4. Hereinafter, three directions orthogonal to one another will be referred to as x direction, y direction, and z direction, respectively. In the present embodiment, the z direction coincides with the vertical direction, and the x-y plane defined by the x direction and the y direction coincides with a horizontal plane.

Figure 1:
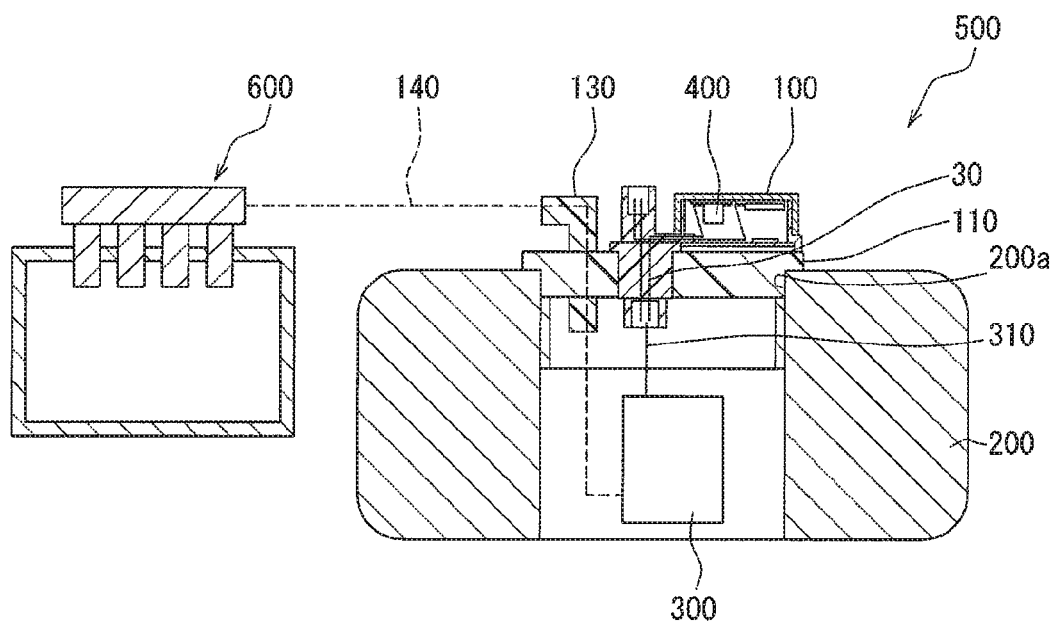
FIG. 1 is a schematic diagram illustrating a fuel pump module and an internal combustion engine.
Figure 1:
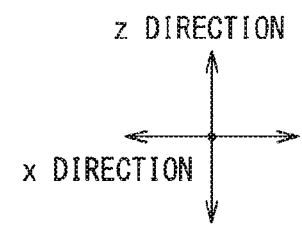

As shown in FIG. 1, the fuel tank lid 100 is one of the components of a fuel pump module 500 mounted on a vehicle. The fuel pump module 500 includes the fuel tank lid 100, a flange 110, a fuel tank 200, a pump 300, and a drive circuit 400. The fuel tank 200 stores fuel in the hollow space of the fuel tank 200 and an opening 200a is closed by the fuel tank lid 100 and the flange 110. The pump 300 feeds fuel to an internal combustion engine 600, and is provided inside the fuel tank 200. The drive circuit 400 drives the pump 300, and is mounted to the fuel tank lid 100 outside the fuel tank 200.

As shown in FIG. 1, the pump 300 and the drive circuit 400 are electrically connected to each other via a pump drive wiring 310 and via a terminal 30 of the fuel tank lid 100. Fuel pumped up by the pump 300 is fed to the internal combustion engine 600 through a fuel supply pipe 130 in the flange 110, and through a fuel pipe 140 assembled to the fuel supply pipe 130. As shown in FIG. 1, the fuel pipe 140 is represented by a broken line. The opening 200a of the fuel tank 200 is positioned vertically higher than the walls that form the fuel tank 200. The outer face of the upper wall in which the opening 200a is formed coincides with the horizontal plane. Therefore, vaporized fuel may be discharged from the fuel tank 200 through the opening 200a to the external atmosphere, but hardly stays around the opening 200a (around the fuel tank lid 100). In the present embodiment, vaporized fuel will be referred to as fuel vapor.

Figure 2:
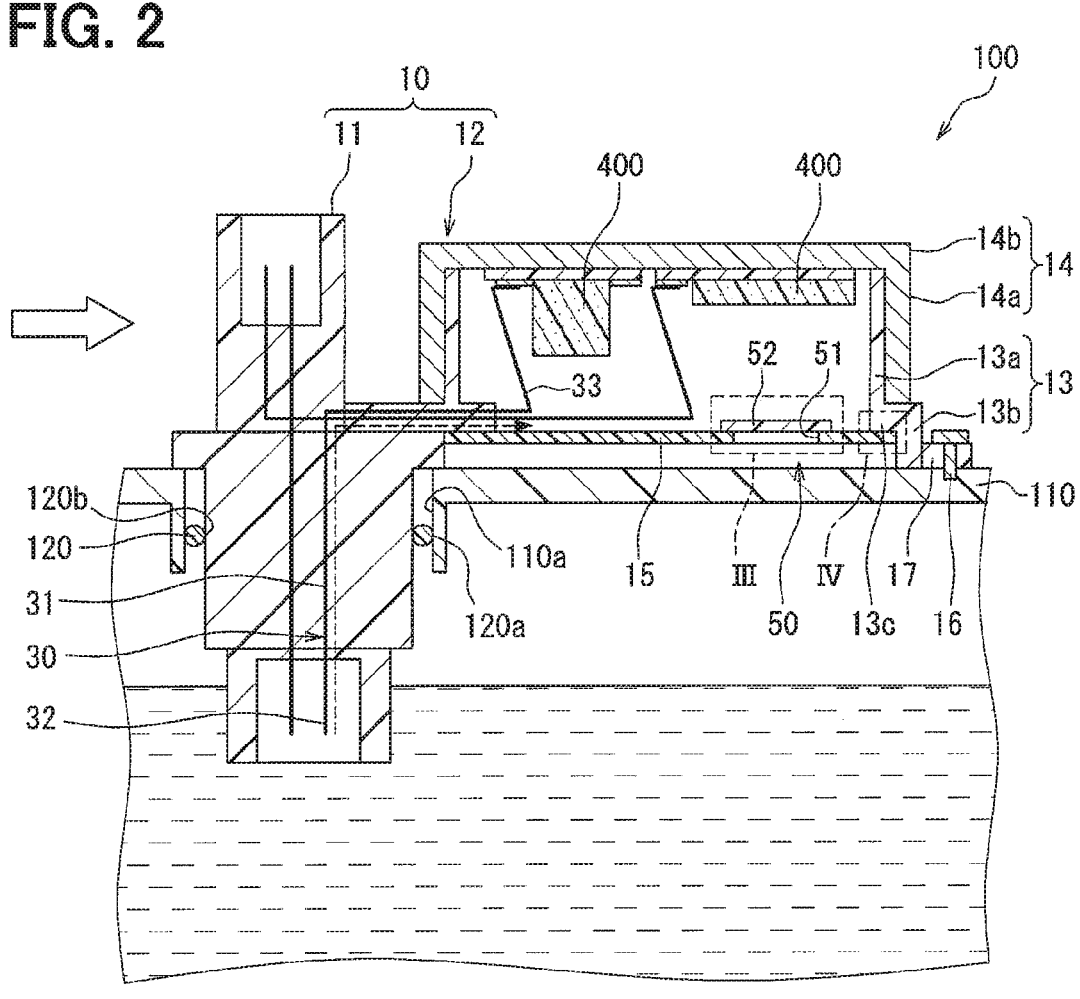
FIG. 2 is a cross-sectional view illustrating a schematic configuration of a fuel tank lid according to a first embodiment fixedly attached to a flange.

As shown in FIG. 2, the fuel tank lid 100 is provided to an opening 110a of the flange 110. An O-ring 120 is provided to the opening 110a. An outer annular surface 120a of the O-ring 120 is in contact with the rim of the flange 110 that defines the opening 110a all around, while an inner annular surface 120b is in contact with the fuel tank lid 100 all around. Thus the opening 110a of the flange 110 is closed by the fuel tank lid 100 and the O-ring 120.

The fuel tank lid 100 includes a lid part 10, the terminal 30, and a discharge structure 50. The lid part 10, while closing the opening 200a of the fuel tank 200 together with the flange 110, serves as the function of carrying the drive circuit 400. The lid part 10 closes part of the opening 200a of the fuel tank 200 by closing the opening 110a of the flange 110, as described above.

The lid part 10 includes an inserted part 11 that is inserted into the opening 200a (opening 110a), and a storage part 12 that is located outside the fuel tank 200 and stores the drive circuit 400 in a hollow space in itself. As shown in FIG. 2, the inserted part 11 extends in the z direction, and the storage part 12 has a box-like shape. Part of the inserted part 11 is inserted into the fuel tank 200, while the rest is outside the fuel tank 200 and is exposed to the external atmosphere. The O-ring 120 mentioned above is provided between the inserted part 11 inside the fuel tank 200 and the flange 110, so as to minimize leakage of fuel vapor to the external atmosphere through the gap between the inserted part 11 and the flange 110.

The storage part 12 includes a side wall 13 that is in an annular shape, an upper closure part 14 that closes a first opening, which is positioned vertically on an upper side, of the two openings of the side wall 13, and a lower closure part 15 that closes a second opening positioned vertically on a lower side. The inserted part 11 and the side wall 13 described above are made of the same resin material, and mechanically coupled to each other, with a side portion of the inserted part 11 exposed from the fuel tank 200 to the external atmosphere being in contact with an outer annular surface of the side wall 13. Here, the resin material is a polyphenylene sulfide resin, or polybutylene terephthalate resin, for example.

The side wall 13 includes a first annular part 13a to which the upper closure part 14 is assembled, and a second annular part 13b to which the lower closure part 15 is assembled. The first annular part 13a has an inner diameter in the x direction shorter than that of the second annular part 13b, so that a step 13c is formed at the connecting portion between the annular parts 13a and 13b in accordance with the difference in inner diameter. A space is formed between the step 13c and the flange 110, and the lower closure part 15 is assembled to the second annular part 13b in a state where the upper peripheral surface of the lower closure part 15 faces the step 13c. As shown in FIG. 2, a space is also formed between the lower closure part 15 and the flange 110, and the space communicates with the external atmosphere. The second annular part 13b also has a screw-fastened portion 17 that receives screws 16. The lid part 10 is fastened to the flange 110 with screws 16.

The upper closure part 14 is made of a metal material such as copper or aluminum, and serves as the function of dissipating the heat generated in the drive circuit 400 to the external atmosphere. The upper closure part 14 according to the present embodiment includes an enclosure part 14a that surrounds the first annular part 13a in contact with the outer annular surface of the first annular part 13a, and a ceiling part 14b that closes the first opening of the side wall 13. The drive circuit 400 is formed by a plurality of electronic elements, at least one of these electronic elements being mounted on the upper closure part 14 (ceiling part 14b). In the present embodiment, all the electronic elements that form the drive circuit 400 are mounted on the upper closure part 14. In this way, contact between fuel vapor that has entered the hollow space of the storage part 12 and the electronic components of the drive circuit 400 is avoided.

The terminal 30 electrically connects the pump 300 with the drive circuit 400. The terminal 30 is L-shaped and insert-molded in the inserted part 11 and the side wall 13. A central portion 31 of the terminal 30 is covered and is protected by the inserted part 11, the connecting portion between the inserted part 11 and the side wall 13 mentioned above, and the side wall 13. A first end 32 is exposed from the inserted part 11 into the fuel tank 200, while a second end 33 is exposed from the side wall 13 into the hollow space of the storage part 12. The first end 32 is electrically connected to the pump 300, while the second end 33 is electrically connected to the drive circuit 400. The drive circuit 400 includes wiring, and the wiring is electrically connected to the second end 33 of the terminal 30. The wiring of the drive circuit 400 should actually be illustrated separately from the second end 33 of the terminal 30. Here, however, it is not particularly necessary to distinguish them in describing the fuel tank lid 100, and hence the representation in FIG. 2 as if the wiring of the drive circuit 400 were included in the second end 33 of the terminal 30.

The discharge structure 50 is positioned vertically lower than the upper closure part 14 and discharges the fuel vapor that has entered the hollow space of the storage part 12 to the external atmosphere. There is a possibility that fuel vapor may travel up along the interface between the terminal 30 and the lid part 10 into the hollow space of the storage part 12 as indicated with a broken line arrow in FIG. 2. The fuel vapor may then contact the electronic elements that form the drive circuit 400, and the electronic elements may deteriorate as a consequence. Therefore, the fuel vapor that has entered the hollow space of the storage part 12 is discharged to the external atmosphere by means of the discharge structure 50.

Figure 3:
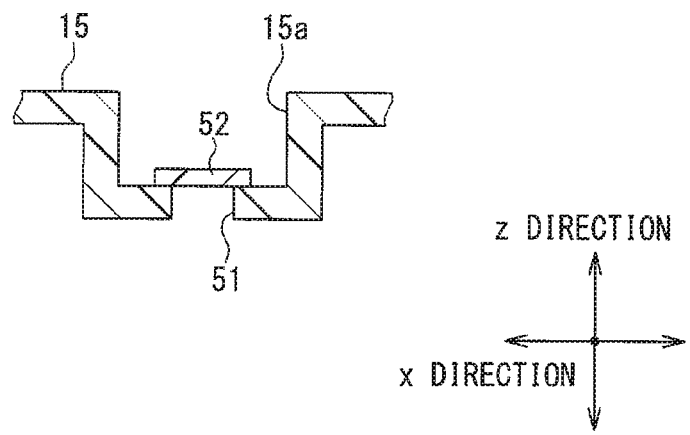
FIG. 3 is an enlarged cross-sectional view of a region III in FIG. 2.

The discharge structure 50 includes a discharge port 51 that is formed in at least one of the lower closure part 15 or the side wall 13 and that discharges the fuel vapor to the external atmosphere. In the present embodiment, the discharge port 51 is formed in the lower closure part 15. The in fuel tank lid 100 is mounted on a vehicle. The discharge port 51 is disposed in the downwind of the air flow created during driving of the vehicle as shown with a white arrow in FIG. 2. As shown in FIG. 3, the lower closure part 15 has a recess 15a that is recessed vertically downward, and the discharge port 51 is formed in the recess 15a. The discharge port 51 is covered with a breathable filter 52 that allows permeation of gasses including fuel vapor and not of liquids.

Figure 4:
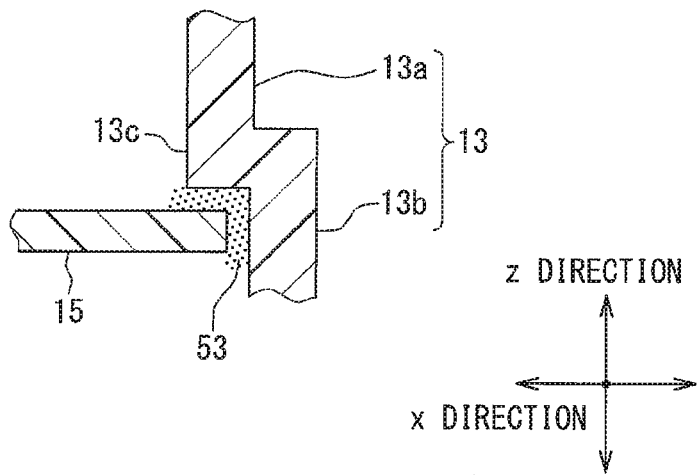
FIG. 4 is an enlarged cross-sectional view of a region IV in FIG. 2.

In addition to the discharge port 51, the discharge structure 50 according to the present embodiment includes an adhesive 53 made of a material having a fuel vapor permeability higher than the upper closure part 14 is. As shown in FIG. 4, the adhesive 53 is provided between the step 13c of the side wall 13 and an upper peripheral face of the lower closure part 15 and mechanically coupling the side wall 13 and the lower closure part 15. The adhesive 53 is at the vertically lowest height inside the hollow space of the storage part 12 next to the recess 15a.

Moreover, the discharge structure 50 according to the present embodiment also includes a portion made of a material having a fuel vapor permeability higher than the upper closure part 14 is at least in one of the lower closure part 15 and the side wall 13. In the present embodiment, the lower closure part 15 and the side wall 13 are each made of a material having a fuel vapor permeability higher than the upper closure part 14 is. Therefore, the discharge structure 50 includes both of the side wall 13 and the upper closure part 14.

Next, the advantageous effects of the fuel tank lid 100 according to the present embodiment will be described. Since the fuel vapor is heavier than the air, the fuel vapor accumulates from the lower closure part 15 of the storage part 12 toward the upper closure part 14. In the fuel tank lid 100, the discharge structure 50 is positioned vertically lower than the upper closure part 14. Therefore, the fuel vapor can be discharged to the external atmosphere more efficiently as compared to a configuration where the discharge structure is formed in the upper closure part. Therefore, damage potential of the drive circuit 400 caused by fuel vapor is reduced.

All the electronic elements that form the drive circuit 400 are mounted on the upper closure part 14. This way, contact between fuel vapor and electronic elements can be avoided. Thus deterioration of electronic elements is minimized.

The opening 200a of the fuel tank 200 is positioned vertically higher than the walls that form the fuel tank 200. Therefore, unlike a configuration where the opening of the fuel tank is positioned vertically lower than the walls, stagnation of fuel vapor around the opening 200a (around the fuel tank lid 100) because of the walls is reduced.

The discharge port 51 is formed in the lower closure part 15. This way, the fuel vapor can be discharged to the external atmosphere through the discharge port 51.

The discharge port 51 is disposed in the downwind of the air flow created during driving. Therefore, the fuel vapor discharged from the discharge port 51 to the external atmosphere can be driven away from the fuel tank lid 100 by the air flow.

The discharge port 51 is covered with the breathable filter 52. Therefore, liquid such as water is prevented from entering the hollow space of the storage part 12.

The recess 15a is formed in the lower closure part 15, and the discharge port 51 is formed in the recess 15a. This way, the fuel vapor can be introduced into the recess 15a, so that the fuel vapor can be discharged to the external atmosphere from the discharge port 51.

The lower closure part 15 and the side wall 13 are mechanically coupled to each other by the adhesive 53 made of a material having a fuel vapor permeability higher than the upper closure part 14 is. This way, the fuel vapor can be discharged to the external atmosphere through the adhesive 53.

The adhesive 53 is at the vertically lowest height inside the hollow space of the storage part 12 next to the recess 15a. This way, even when the fuel vapor is not completely discharged from the discharge port 51 and accumulates vertically above the recess 15a, the fuel vapor can be discharged to the external atmosphere through the adhesive 53.

The lower closure part 15 and the side wall 13 are each made of a material having a fuel vapor permeability higher than the upper closure part 14 is. Therefore, fuel vapor can be discharged to the external atmosphere through each of the lower closure part 15 and the side wall 13.

(Second Embodiment)

Hereinafter, a second embodiment of the present disclosure will be described with reference to FIG. 5. The fuel tank lid according to the second embodiment has much in common with the one according to the previously described embodiment. Therefore, the same parts will not be described again and different features will mainly be described below. Elements that are identical to the elements shown in the first embodiment described above are given the same reference numerals.

The first embodiment showed an example where the upper closure part 14 has the enclosure part 14a and the ceiling part 14b. In the present embodiment, the upper closure part 14 has the ceiling part 14b, while the side wall 13 of the storage part 12 has an inlet port 60.

The inlet port 60 is provided for introducing the air from the external atmosphere into the hollow space of the storage part 12 so as to guide the fuel vapor that has entered the hollow space of the storage part 12 toward the discharge structure 50. The inlet port 60 is positioned vertically higher than the discharge structure 50 (discharge port 51, adhesive 53, and lower closure in part 15), and covered with a breathable filter 61 that allows permeation of gasses including the fuel vapor but not of liquids. The inlet port 60 is disposed in the upwind of the air flow created during driving, while the discharge structure 50 is disposed in the downwind. Therefore, at least one of the electronic elements of the drive circuit 400 is exposed to the air current flowing from the inlet port 60 into the hollow space of the storage part 12.

This way, unlike a configuration without an inlet port, the fuel vapor can be moved from the inlet port 60 toward the discharge structure 50. Thus, the fuel vapor can be discharged to the external atmosphere efficiently.

The inlet port 60 is positioned vertically higher than the discharge structure 50. Therefore, the fuel vapor can be moved from the inlet port 60 at a vertically higher position toward the discharge structure 50 at a vertically lower position, and discharged to the external atmosphere efficiently through the discharge structure 50.

The inlet port is covered with the breathable filter 61. Therefore, liquid such as water is prevented from entering the hollow space of the storage part 12.

The inlet port 60 is disposed in the upwind of the air flow created during driving, while the discharge structure 50 is disposed in the downwind. This way, an air current created during driving is introduced from the inlet port 60 into the hollow space of the storage part 12, and the fuel vapor can be discharged to the external atmosphere together with the air current through the discharge structure 50.

At least one of the electronic elements of the drive circuit 400 is exposed to the air flow created during driving. This way, contact between the drive circuit 400 and the fuel vapor is minimized.

While preferred embodiments of the present disclosure have been described above, the present disclosure should not be interpreted to be limited to these embodiments in any way, and can be variously modified without departing from the scope of the subject matter of the present disclosure.

The embodiments showed an example where the fuel tank lid 100 and is the flange 110 are separate parts. However, the lid part 10 of the fuel tank lid 100 may be integral with the flange 110. In this case, the fuel tank lid 100 alone closes the opening 200a of the fuel tank 200 entirely.

While the fuel tank lid 100 has been mainly described in each embodiment, the present disclosure includes the fuel pump module 500 that includes the fuel tank lid 100, the fuel tank 200, the drive circuit 400, and the pump 300.

The embodiments showed an example where the inserted part 11 and the side wall 13 are made of polyphenylene sulfide resin or polybutylene terephthalate resin. However, the resin material that forms each of the inserted part 11 and the side wall 13 is not limited to the examples given above.

The embodiments showed an example where the second annular part 13b has the screw-fastened portion 17 so that the lid part 10 is fastened to the flange 110 with screws 16. However, the structure for fastening the lid part 10 to the flange 110 is not limited to the example given above.

The embodiments showed an example where all the electronic elements that form the drive circuit 400 are mounted on the upper closure part 14. An alternative configuration may be adopted, where, of the plurality of electronic elements forming the drive circuit 400, only those that are prone to deteriorate through contact with fuel vapor, in particular, are mounted on the upper closure part 14. Optionally, all the electronic elements forming the drive circuit 400 may be mounted on the lower closure part 15 or the side wall 13 instead of the upper closure part 14.

The embodiments showed an example where the discharge port 51 is formed in the lower closure part 15. Alternatively, the discharge port 51 may be formed in the side wall 13, or may be formed each in the lower closure part 15 and the side wall 13.

The embodiments showed an example where the fuel tank lid 100 is exposed to the air flow created during driving. Alternatively, the fuel tank lid 100 may not be exposed to the air flow created during driving.

The embodiments showed an example where the recess 15a is formed in the lower closure part 15. Alternatively, the lower closure part 15 may not have the recess 15a. Therefore, the discharge port 51 may not be formed in the recess 15a.

The embodiments showed an example where the discharge port 51 is covered with the breathable filter 52. Alternatively, the discharge port 51 may not be covered with the breathable filter 52.

The embodiments showed an example where the discharge structure 50 includes the adhesive 53. Alternatively, the discharge structure 50 may not include the adhesive 53, and the side wall 13 and the lower closure part 15 may not be mechanically coupled to each other via the adhesive 53. For example, an alternative configuration may be adopted wherein the side wall 13 and the lower closure part 15 are mechanically joined together by being fitted to each other.

The embodiments showed an example where the adhesive 53 is at the vertically lowest height inside the hollow space of the storage part 12 next to o the recess 15a. Alternatively, the adhesive 53 may be positioned elsewhere in the vertical direction, as long as the adhesive 53 is lower than the upper closure part 14.

The embodiments showed an example where the lower closure part 15 and the side wall 13 are each made of a material having a fuel vapor permeability higher than the upper closure part 14 is, and the discharge structure 50 includes both of the side wall 13 and the upper closure part 14. Alternatively, the discharge structure 50 may not include both of the side wall 13 and the upper closure part 14.

Figure 5:
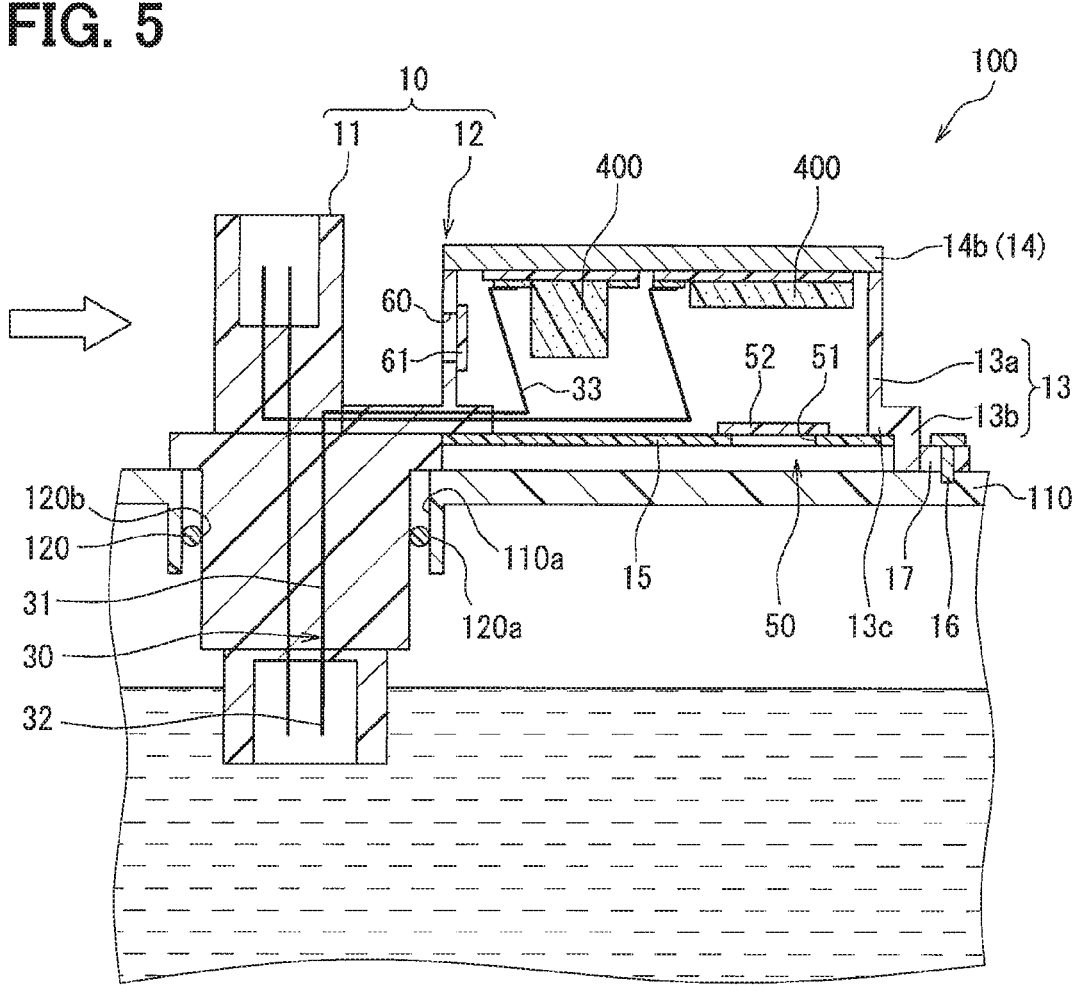
FIG. 5 is a cross-sectional-sectional view illustrating a schematic configuration of a fuel tank lid according to a second embodiment fixedly attached to a flange.
Figure 6:
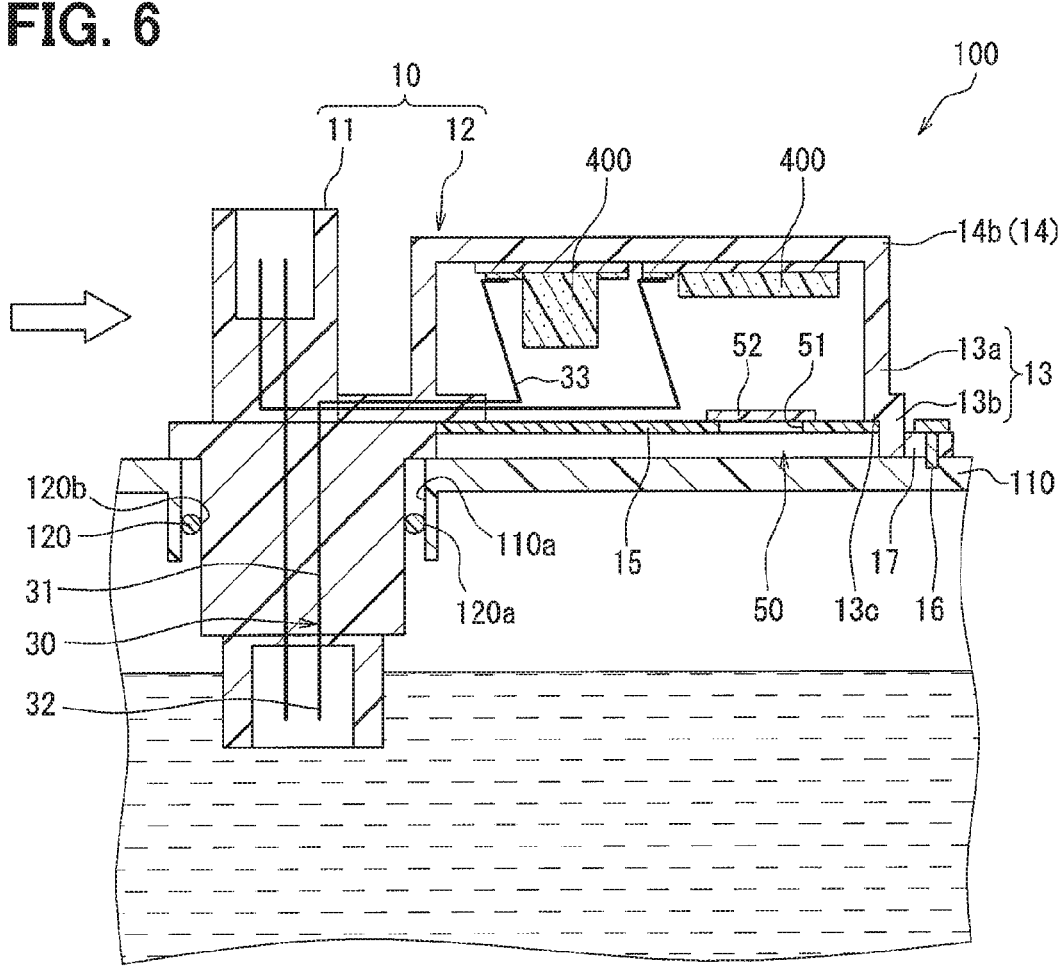
FIG. 6 is a cross-sectional view illustrating a first variation of a fuel tank lid fixedly attached to the flange.
Figure 7:
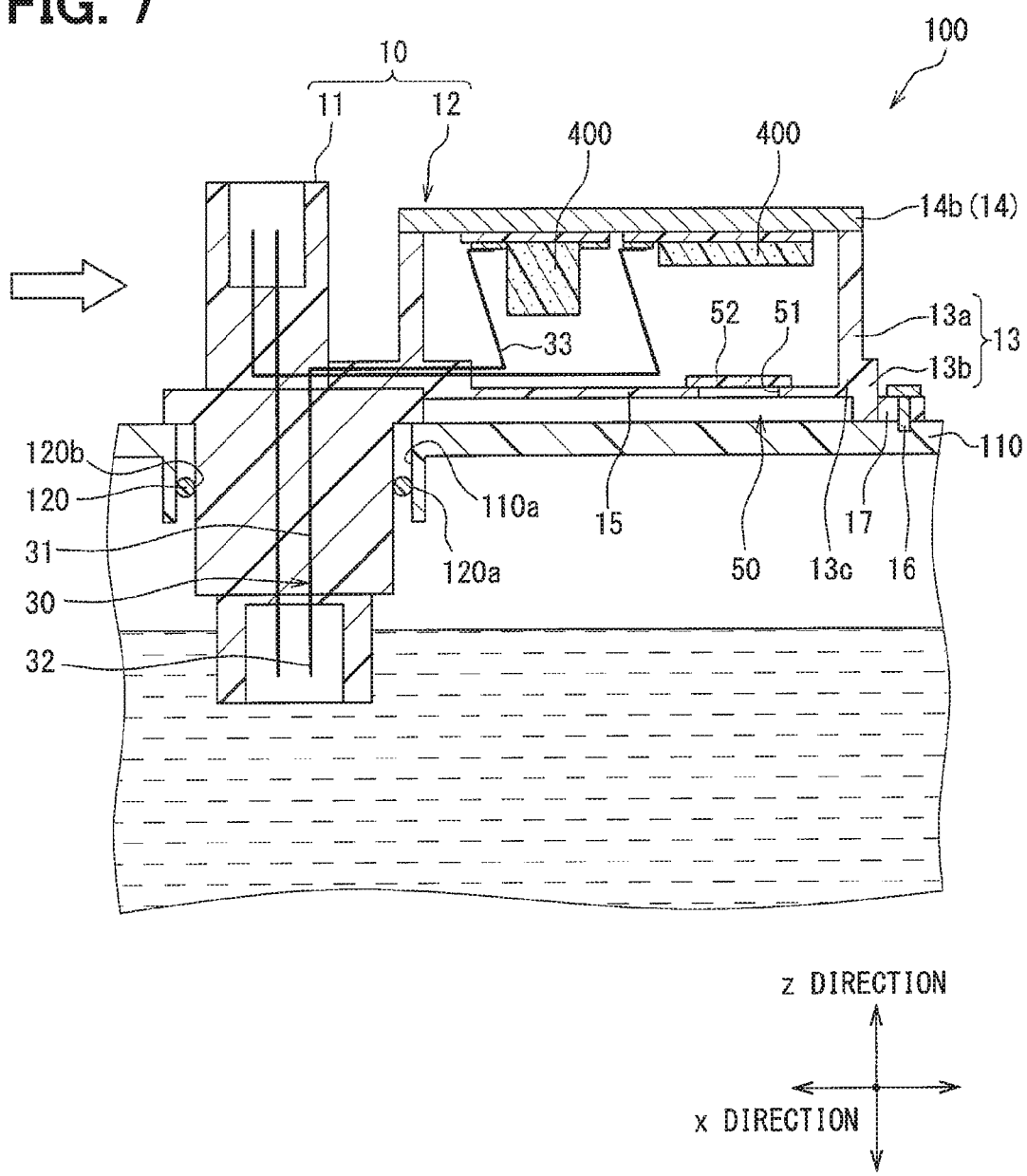
FIG. 7 is a cross-sectional view illustrating a second variation of a fuel tank lid fixedly attached to the flange.
Figure 8:
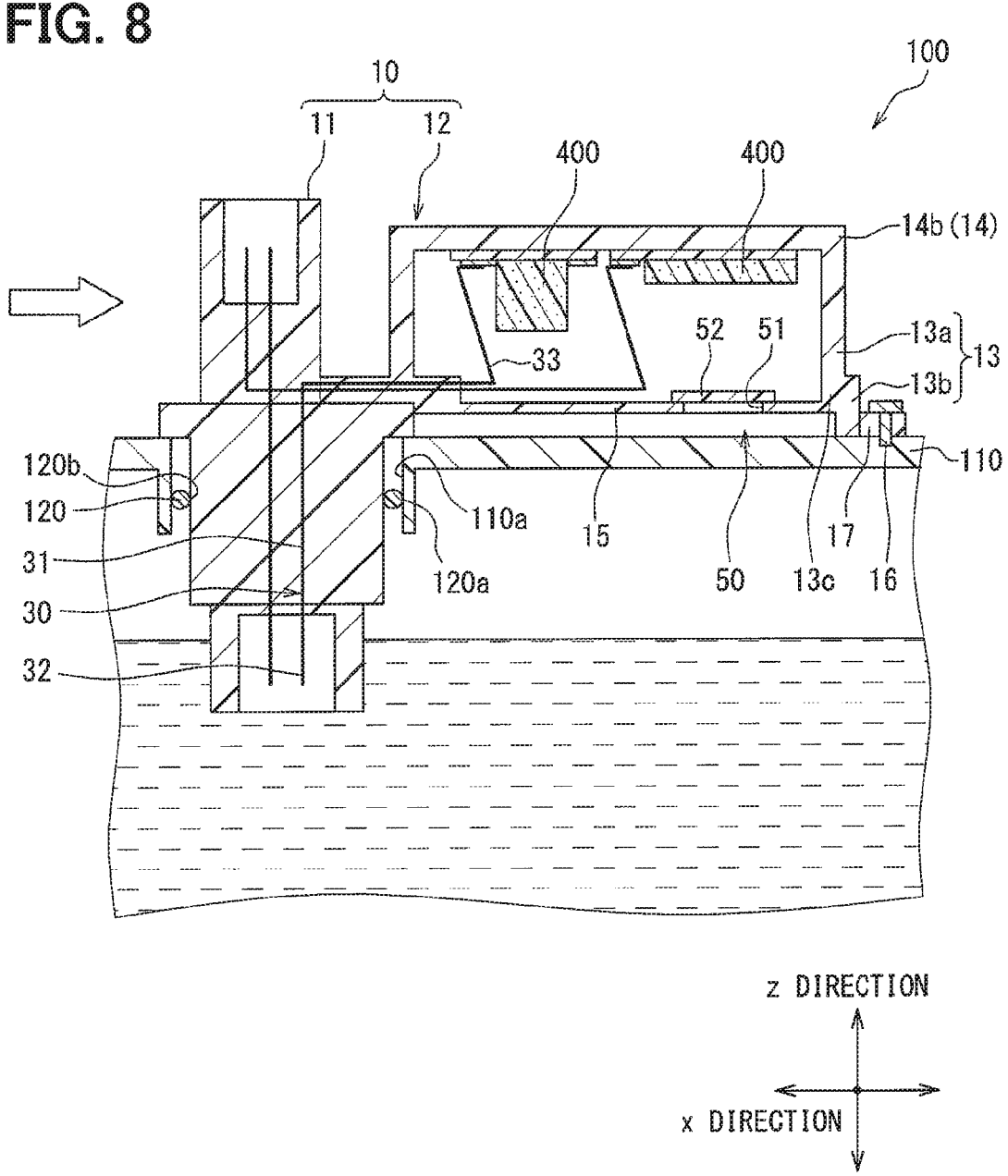
FIG. 8 is a cross-sectional view illustrating a third variation of a fuel tank lid fixedly attached to the flange.

The embodiments showed an example where, as shown in FIG. 2 and FIG. 5, the side wall 13 of the storage part 12, the upper closure part 14, and the lower closure part 15 are separate parts. Alternatively, as shown in FIG. 6, the side wall 13 and the upper closure part 14 may be integral with each other. Alternatively, as shown in FIG. 7, the side wall 13 and the lower closure part 15 may be integral with each other. Moreover, as shown in FIG. 8, the side wall 13, the upper closure part 14, and the lower closure part 15 may be integral with each other.

The second embodiment showed an example where the inlet port 60 is positioned vertically higher than the discharge structure 50 (discharge port 51, adhesive 53, and lower closure part 15). Alternatively, the inlet port 60 may be positioned vertically lower than at least one of the constituent elements of the discharge structure 50.

The second embodiment showed an example where the inlet port 60 is covered with the breathable filter 61. Alternatively, the inlet port 60 may not be covered with the breathable filter 61.

The second embodiment showed an example where at least one of the electronic elements of the drive circuit 400 is exposed to the air current flowing from the inlet port 60 into the hollow space of the storage part 12. An alternative configuration may be adopted, where, of the plurality of electronic elements forming the drive circuit 400, only those that are prone to deteriorate through contact with fuel vapor, in particular, are exposed to the air flow created during driving. Another alternative configuration may be adopted, where all the electronic elements forming the drive circuit 400 are not exposed to the air flow created during driving.

The invention claimed is:

1. A fuel tank lid comprising:
a lid part closing an opening of a fuel tank; and
a terminal electrically connecting a pump provided inside the fuel tank with a drive circuit driving the pump, wherein
the lid part includes
an inserted part inserted into the opening of the fuel tank, and
a storage part located outside the fuel tank and storing the drive circuit in a hollow space of the storage part,
the terminal has a central portion, a first end, and a second end, the central portion being covered and protected by the inserted part and the storage part that are made of a resin material, the first end being connected to the pump inside the fuel tank, and the second end being connected to the drive circuit inside the hollow space of the storage part, the storage part includes
- a side wall that is in an annular shape and has two openings that are a first opening and a second opening,
- an upper closure part that closes the first opening positioned vertically on an upper side of the second opening, of the two openings of the side wall, and
- a lower closure part that closes the second opening positioned vertically on a lower side of the first opening, of the two openings of the side wall, and the fuel tank lid further comprising a discharge structure positioned vertically lower than the upper closure part and discharging a fuel vapor that has travelled along an interface between the terminal and the lid part and entered the hollow space of the storage part, to an external atmosphere.

2. The fuel tank lid according to claim 1, wherein
the drive circuit includes a plurality of electronic elements,
at least one of the plurality of electronic elements is fixedly attached to the upper closure part so as to avoid from being in contact with the fuel vapor.

3. The fuel tank lid according to claim 1, wherein
the discharge structure includes a discharge port that is formed in at least one of the lower closure part or the side wall and discharges the fuel vapor to the external atmosphere.

4. The fuel tank lid according to claim 3, further comprising:
a breathable filter that allows permeation of gasses including the fuel vapor but not of liquids, wherein
the discharge port is covered with the breathable filter.

5. The fuel tank lid according to claim 3, wherein
the lower closure part includes a recess that is recessed vertically downward, and
the discharge port is formed in the recess.

6. The fuel tank lid according to claim 3 mounted on a vehicle, wherein
the discharge port is disposed downwind of an air flow created during driving of the vehicle.

7. The fuel tank lid according to claim 1, wherein
the discharge structure includes a portion made of a material having a fuel vapor permeability higher than the upper closure part is at least in one of the lower closure part and the side wall.

8. The fuel tank lid according to claim 1, wherein
the discharge structure includes an adhesive that mechanically connects the side wall with the lower closure part and is made of a material having a fuel vapor permeability higher than the upper closure part is.

9. The fuel tank lid according to claim 1, wherein
the side wall has an inlet port that introduces air in the external atmosphere into the hollow space of the storage part so as to guide the fuel vapor that has entered the hollow space of the storage part toward the discharge structure.

10. The fuel tank lid according to claim 9, wherein
the inlet port is positioned vertically higher than the discharge structure.

11. The fuel tank lid according to claim 9, further comprising:
a breathable filter that allows permeation of gasses including the fuel vapor but not of liquids, wherein
the inlet port is covered with the breathable filter.

12. The fuel tank lid according to claim 9 mounted on a vehicle, wherein
the discharge structure is disposed downwind of an air flow created during driving of the vehicle, while the inlet port is disposed upwind.

13. A fuel pump module comprising:
the fuel tank lid according to claim 1;
a fuel tank having an opening closed by the fuel tank lid;
a drive circuit mounted on the fuel tank lid; and
a pump provided in the fuel tank and driven by the drive circuit.

14. The fuel pump module according to claim 13, wherein
the opening in the fuel tank is located vertically higher than walls forming the fuel tank.

* * * * *